(12) United States Patent
Duncan et al.

(10) Patent No.: US 7,901,106 B2
(45) Date of Patent: Mar. 8, 2011

(54) SOLID-STATE ILLUMINATOR FOR DISPLAY APPLICATIONS

(75) Inventors: Walter M. Duncan, Dallas, TX (US); Michael Mignardi, Richardson, TX (US); John David Jackson, Euless, TX (US)

(73) Assignee: Texas Instruments Incorporated, Dallas, TX (US)

( * ) Notice: Subject to any disclaimer, the term of this patent is extended or adjusted under 35 U.S.C. 154(b) by 339 days.

(21) Appl. No.: 11/618,473

(22) Filed: Dec. 29, 2006

(65) Prior Publication Data

US 2008/0158874 A1 Jul. 3, 2008

(51) Int. Cl.
*F21V 9/00* (2006.01)

(52) U.S. Cl. ............... 362/231; 362/551; 362/555

(58) Field of Classification Search ............... 362/231, 362/344, 335, 555
See application file for complete search history.

(56) References Cited

U.S. PATENT DOCUMENTS

| | | | | |
|---|---|---|---|---|
| 6,139,174 A | * | 10/2000 | Butterworth | 362/555 |
| 2006/0203486 A1 | * | 9/2006 | Lee et al. | 362/244 |
| 2007/0014123 A1 | * | 1/2007 | Cianciotto | 362/558 |
| 2007/0291812 A1 | * | 12/2007 | Petersen et al. | 372/103 |

* cited by examiner

*Primary Examiner* — Sandra L O Shea
*Assistant Examiner* — Meghan K Dunwiddie
(74) *Attorney, Agent, or Firm* — Charles A. Brill; Wade James Brady, III; Frederick J. Telecky, Jr.

(57) ABSTRACT

The disclosure in one aspect provides an illuminator that includes a plurality of segmented diodes to generate a plurality of light beams. In another aspect, the illuminator may independently control current to some or all of the diodes.

18 Claims, 6 Drawing Sheets

SOLID-STATE ILLUMINATOR FOR DISPLAY APPLICATIONS

BACKGROUND OF THE DISCLOSURE

1. Field of the Disclosure

The disclosure herein relates generally to a method and apparatus for generating light from a laser source for use in visual display applications.

2. Description of the Related Art

Viewers generally evaluate display systems based on several criteria such as image size, resolution, contrast ratio, color purity, and brightness. Image brightness is an important metric since the available brightness can limit the size of a projected image and also because it can control how well the image can be seen in high levels of ambient light. Brightness of a projected image typically can be increased by increasing the size of the light source used to form the image. However, increasing the size of the light source also can increase the cost, size, and weight of the display system. Additionally, larger light sources generate additional heat that also is not desirable.

Another approach has been to use an inherently bright light source, such as a laser. A laser produces a highly monochromatic beam of light. In one such system a separate diode pumps light into separate glass/crystal rods. Such systems are commonly referred to as solid-state illuminators. Additional elements, such as frequency-doublers, polarizing elements and output couplers are used to provide continuous light of each primary color. Some such systems utilize three spaced-apart diodes, which can occupy substantial space and can be relatively inefficient. Additionally, the same amount of current is typically provided to each diode. The various components, such as solid-state rods, however, can have different gains or can develop different gains over time, resulting in unbalanced light output from the different lasers. Thus, there is a need for an improved solid-state illuminator that addresses at least some of the above-noted deficiencies.

SUMMARY OF THE DISCLOSURE

The disclosure in one aspect provides a light illuminator that generates light at a plurality of output wavelengths. In one aspect, the light illuminator includes a plurality of solid-state diodes, wherein each diode pumps light into a corresponding rod or rods at a wavelength that is selected from a first plurality of wavelengths of light and a processor that independently controls electric power or current input to each of the diodes to balance the generated light at the plurality of output wavelengths.

In another aspect, the illuminator may include a plurality of segmented solid-state diodes wherein each diode pumps light from a selected wavelength into a separate rod that converts the received light at a first wavelength into a second wavelength; and a frequency multiplier associated with each of the rods that multiplies (typically doubles) the frequency of the light received from its corresponding rod to produce visible light at a wavelength that corresponds to one of the wavelengths in the plurality of output wavelengths of light.

In another aspect, elements that provide functions of filtering, polarization, lenses, mirrors may be provided as optical elements corresponding to some or all of the rods or such elements may be provided as segmented optical elements within the illuminator.

In another aspect, the disclosure provides a method for producing a plurality of output light beams that includes generating a first plurality of wavelengths of light by a plurality of solid-state diodes, pumping light at each of the wavelengths in the first plurality of wavelengths into a separate solid-state rod and controlling input current to each of the solid-state diodes so as to balance power to the solid-state rods. In another aspect, pulse width modulation may be used for color creation (and bit depth) utilizing separate switching of color channels.

In another aspect, the disclosure provides a method for generating a plurality of light beams, wherein the method comprises: generating a first plurality of wavelengths of light using a plurality of segmented solid-state diodes, converting each of the wavelengths in the first plurality of wavelengths into a corresponding wavelength in a second plurality of wavelengths of light using a separate rod associated with each of the solid-state diodes, and processing light corresponding to each of the wavelengths of light in the second plurality of wavelengths to produce the plurality of output light beams.

Examples of the more important features of the invention have been summarized herein rather broadly in order that the detailed description thereof that follows may be better understood, and in order that the contributions to the art may be appreciated. There are, of course, additional features of the apparatus and methods described hereinafter, which will form the subject of the claims.

BRIEF DESCRIPTION OF THE DRAWINGS

The following figures form part of the present disclosure and are included to further demonstrate certain aspects of the claimed subject matter and should not be used to limit the claimed subject matter. The claimed subject matter may be better understood by reference to one or more of these drawings in combination with the description of the drawings presented herein. Consequently, a more complete understanding of the various embodiments and further features and advantages thereof may be acquired by referring to the following description taken in conjunction with the accompanying drawings, in which like numerals have generally been assigned to like elements, wherein:

DETAILED DESCRIPTION OF THE DISCLOSURE

Illustrative embodiments of the claimed subject matter are described in detail below. In the interest of clarity, not all features of an actual implementation are described in this disclosure. It will of course be appreciated that in the numerous implementation-specific embodiments, features may be added or changes may be made by one of ordinary skill in the art having the benefit of the disclosure, which changes, modifications etc. will vary from one implementation to another but fall within the scope of the disclosure and the claimed subject matter.

Figure 1:
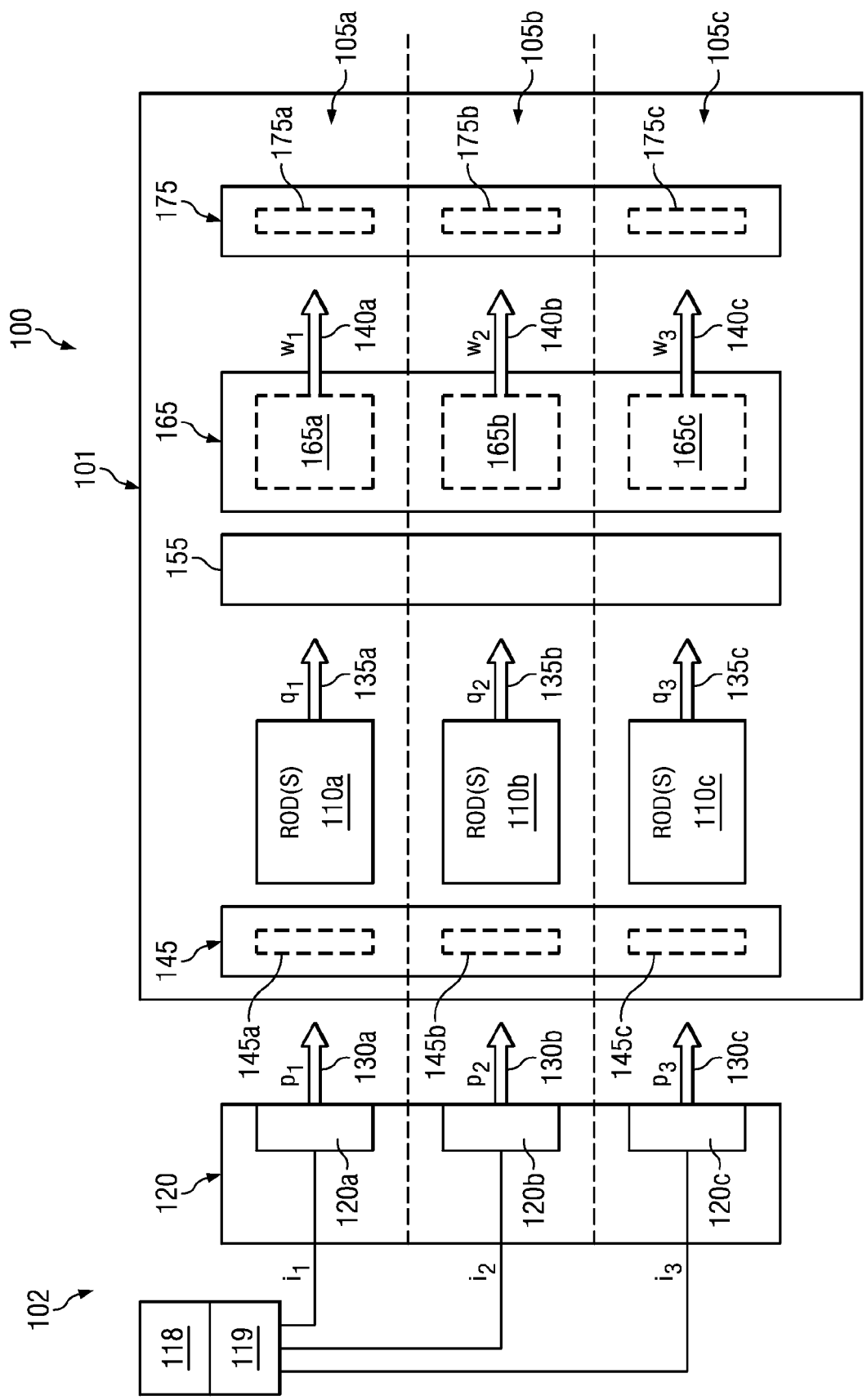
FIG. 1 is a schematic illustration of an exemplary illuminator for display applications, according to one embodiment of the disclosure.

FIG. 1 schematically illustrates an exemplary illuminator 100 that may be used to generate a plurality of wavelengths of light. The illuminator 100 includes a laser module 101 that contains optical and other elements for producing the plurality of wavelengths of light ($w_1$, $w_2$, $w_3$ etc.) (output beams) and a pumping module 102 for activating the elements of the laser module 101. The laser module 101 may further include a plurality of lasers, such as lasers 105a, 105b and 105c, each capable of producing a characteristic wavelength of light ($w_1$, $w_2$, $W_3$ etc.). In one aspect, the plurality of lasers may be assembled on a single mounting element. A laser may include a back and front reflective element defining a laser cavity, and a solid-state rod disposed within the laser cavity. Additionally, a laser may further include a polarizer and a frequency multiplier (such as a frequency-doubler) disposed within the laser cavity. The plurality of lasers may be constructed to be adjacent to each other and arranged to produce a plurality of light beams substantially parallel to each other. In one aspect, the light beams may include any desired colors, including the primary colors red, green and blue light. In one aspect, the illuminator 100 may produce all colors simultaneously. Certain elements of each laser, such as the solid-state rods, may be wholly contained within their respective laser cavities. Other elements, such as the back and front reflective elements, polarizer and frequency multipliers may traverse multiple laser cavities and be appropriately arranged so that a portion of the traversing element is associated with a particular laser cavity and is designed to operate according to the specifications of the laser cavity with which the portion is associated In one aspect, each laser includes a laser cavity having a front and back reflective element oriented so that they share a common optical axis. Typically, the back reflective element is a dichroic filter array 145 that may include an array of dichroic filters 145a, 145b and 145c that are associated with lasers 105a, 105b and 105c respectively. The dichroic filter array 145 selectively passes a first range of wavelengths of light (such as the range that includes light 130a having wavelength $p_1$, light 130b having wavelength $p_2$, and light 130c having wavelength $p_3$) while reflecting other wavelengths (including a second range of wavelengths, such as the range including light 135a having wavelength $q_1$, light 135b having wavelength $q_2$, and light 135c having wavelength $q_3$). Thus, in one aspect, the filter array 145 is substantially transmissive to one set of wavelengths and substantially reflective to other wavelengths.

The front reflective element typically is an output coupler array 175, which may include an array of output couplers 175a, 175b and 175c that selectively reflect a second range of wavelengths (for example, wavelengths $q_1$, $q_2$ and $q_3$) to the laser cavity and transmit a third range of wavelengths (for example, light 140a having wavelength $w_1$, light 140b having wavelength $w_2$, and light 140c having wavelength $w_3$) outside the laser cavity as visible output light beams Each laser cavity further may contain a lasing element disposed along the common optical axis of the laser cavity. In one aspect, the lasing element is a solid-state lasing element, such as one of solid-state rods 110a, 110b, and 110c. The solid-state rods 110a, 110b, and 110c are responsive to optical pumping via wavelengths $p_1$, $p_2$, and $p_3$ respectively and emit light at wavelengths $q_1$, $q_2$, and $q_3$, respectively. In one aspect, each or any of the solid-state rods 110a, 110b or 110c may include one or more glass rods or crystal rods. In another aspect, any of the solid-state rods may be driven by any suitable source, including a luminescent source, a super luminescent source, a laser source or a super radiant source.

In one aspect of the disclosure, a polarizing optical element, such as polarizer 155 and a frequency-multiplier 165 (e.g. a frequency-doubler) may traverse multiple laser cavities and have a portion disposed between the solid-state rods 110a, 110b and 110c and the output coupler 175. In one aspect, the polarizer 155 may include a single polarizer extending between adjacent laser cavities where a portion of the polarizer is used in each laser cavity. The frequency-multiplier 165 may extend between adjacent laser cavities and may further include an array of frequency-multipliers 165a, 165b, and 165c such that each frequency-multiplier is associated with a laser cavity. The frequency-multiplier is designed to multiply the wavelength produced by the solid-state rod of the associated laser cavity to produce a visible output light beam. In one aspect, a frequency-multiplier 165 is a frequency-doubler. In one aspect, the frequency-multiplier 165 may include a polarization-sensitive periodically-poled lithium niobate (PPLN) and/or a periodically-poled lithium tantalate (PPLT) element.

The pumping module 102, in aspect, includes a pump diode array 120 that contains pump diodes 120a, 120b, and 120c, wherein each pump diode is associated with a corresponding laser, such as the lasers 105a, 105b and 105c, respectively, and each aligned with a corresponding solid-state rod 110a, 110b and 110c, respectively. Each of the pump diodes 120a, 120b and 120c may comprise a single diode or multiple diodes, each diode having adequate emission power to pump the desired rod areas of its associated rod.

In one aspect, some or all of the pump diodes 120a, 120b, and 120c may be segmented physically and/or electrically. The terms segmentation of diodes and segmented-diodes herein mean any single structure that contains diodes or groups of diodes that can be operated or act independently. Segmentation of diodes may be realized in any suitable manner, including but not limited to, segmentation that allows independent electric addressability of each diode, or where different epitaxial layers or structures relating to the diodes are formed on a common substrate. Further, some or all of the diodes, such as diodes 120a, 120b, and 120c, may be configured to produce the same or different frequencies. Also, the diodes may be segmented by arranging the diodes on a common substrate, each diode occupying a separate physical space. The diodes may also share certain common elements. Additionally, the diodes 120a, 120b and 120c may be segmented in a manner that allows independent supply of power or current to each diode so as to balance the output light beams $w_1$, $w_2$, and $w_3$ or the gain differences among certain elements of the lasers, such as the rods 110a, 110b and 110c, to achieve desired power levels. In another aspect, pulse-width modulation may be used for color creation (and bit depth) using separate switching of color channels.

The pumping module 102 further may include a processor 118 linked or coupled to the pump diodes 120a, 120b, and 120c to independently or selectively control the supply of currents $i_1$, $i_2$ and $i_3$ from a power supply 119 to the diodes 120a, 120b, and 120c respectively. The processor 118, in one aspect, independently controls electric power input to each of the diodes 120a, 120b and 120c to balance the output light beams from the module 101. In another aspect, the processor 118 controls the supply of currents $i_1$, $i_2$ and $i_3$ to balance the differences in gains of the rods 110a, 110b and 110c. In one aspect any appropriate feedback circuit may be used to control the supply of currents to the rods. In another aspect, the processor 118 may control the current to the diodes 120a, 120b and 120c or control the operation of such diodes in accordance with programmed instructions provided to the processor. The processor also may perform pulse-width modulation to create light beams.

Each pump diode responds to the current provided by the processor 118 by emitting light of a specific wavelength, such as $p_1$, $p_2$ and $p_3$, selected to optically pump the lasing element (i.e., the solid-state rods) of its associated laser. In one aspect, a pump diode may be a solid-state diode that may be arranged to generate super luminescent diode light or a diode arranged to generate laser diode light, each diode designed to pump desired light into its respective solid-state rod. Any number of glass/crystal rods may be used to provide any desired color points. Any segmentation of diodes together with any distribution of rods may be used to balance gain differences between the rods.

Referring to the operation of laser 105a in general, processor 118 provides current $i_1$ to the pump diode 120a, thereby exciting light 130a having wavelength $p_1$, which is generally infrared light. The light 130a passes through filter 145a to enter the laser cavity and optically pumps the solid-state rod 110a. The solid-state rod absorbs light 130a at wavelength $p_1$ (performs a frequency conversion) and emits light 135a at wavelength $q_1$. Light 135a is polarized using polarizer 155. Light at wavelength $q_1$ interacts with the frequency-multiplier 165a to produce light 140a having wavelength $w_1$, which is typically in the range of visible light. Light 140a passes through the output coupler to exit the laser cavity, while light 135a is reflected back into the cavity, and may be used in the process of stimulated emission to produce additional laser light in the cavity. Wavelengths $w_1$, $w_2$ and $w_3$ may typically include red, green, and blue (RGB) light components, typical for use in projection display applications but are not limited to any set of colors. In addition, the use of three colors, rods and other optical elements shown and described herein are for illustrative purposes only and are not meant as a limitation on any of the embodiments of the disclosure.

In addition to the optical components discussed above, appropriate and suitable additional optical elements, such as multi-lens arrays, dielectric elements, holographic elements, and the like, may also be disposed at suitable locations within the illuminator 100.

The solid-state rods 110a, 110b and 110c may include a back end and a front end, wherein the back end is shown in FIG. 1 as proximate to the pump diode section 120 and the front end is distal to the pump diode of FIG. 1. In one aspect, such as shown in FIG. 1, the solid-state rods 110a, 110b and 110c are aligned with pump diodes 120a, 120b and 120c substantially along the optical axis of the laser, thereby enabling back-end pumping of each of the solid-state rods. In other aspects, the pump diode segments may provide optical pumping from any side (top, bottom or another side) of the solid-state rods. Additionally, any suitable combination of end-pumping and side-pumping may be used.

Figure 5:
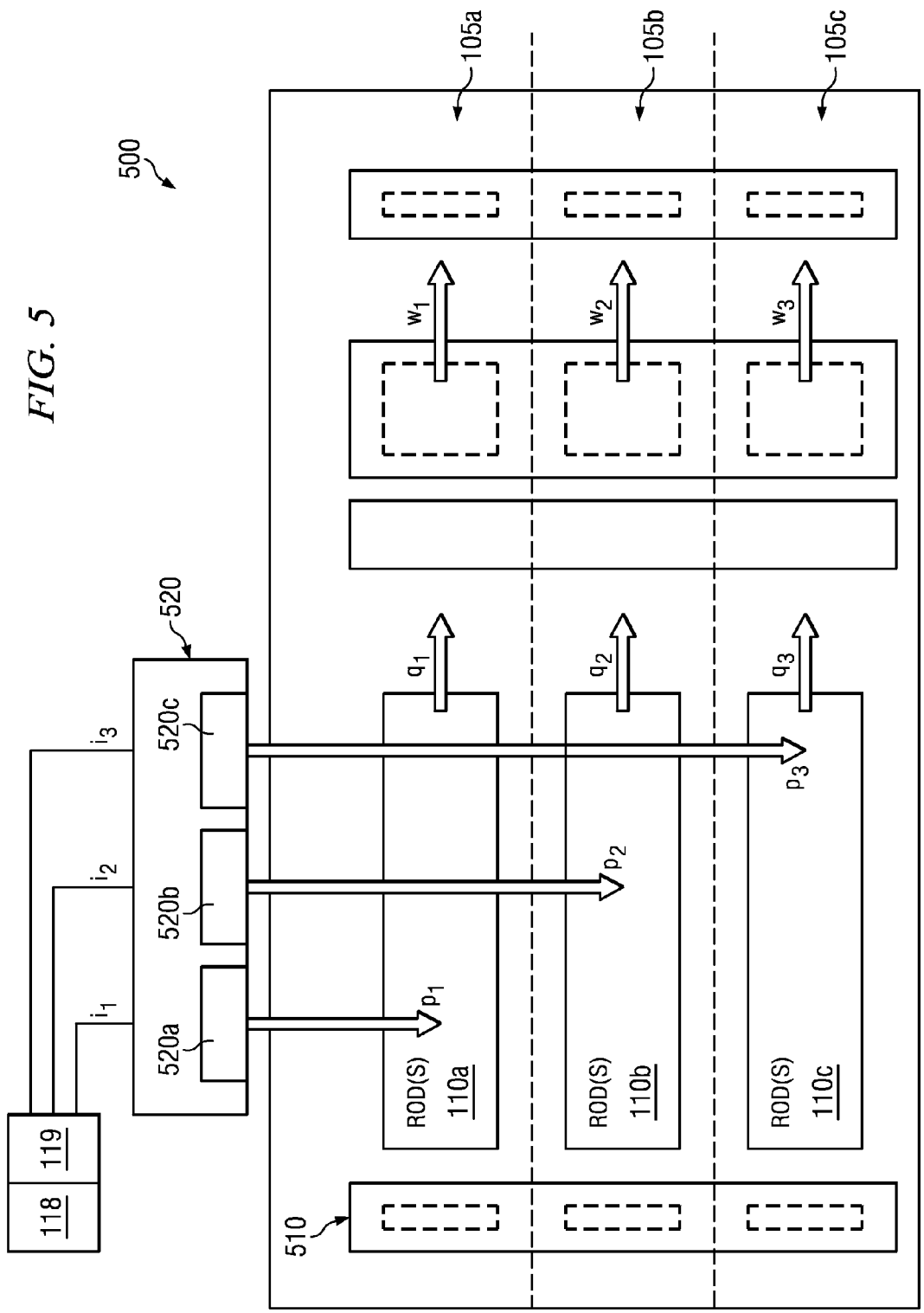
FIG. 5 is a schematic illustration of an illuminator in which light may be pumped from a side of the rods, according to one embodiment of the disclosure.
Figure 6:
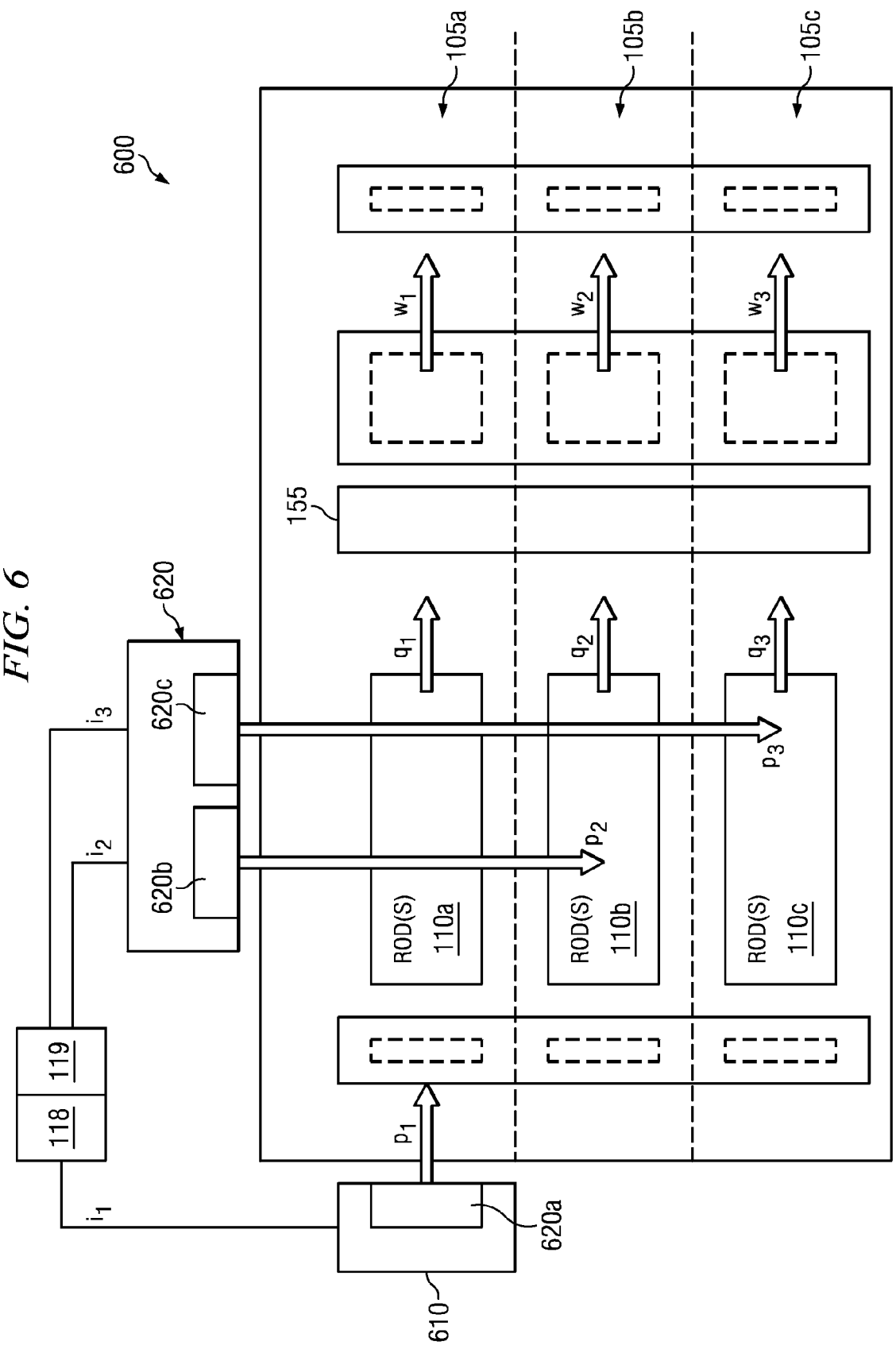
FIG. 6 is a schematic illustration of an illuminator in which light may be pumped into the rods from a side of one of the rods and from an end of another rod, according to one embodiment of the disclosure.

FIG. 5 shows an illuminator 500 in which a pump diode array 520 optically pumps the solid-state rods 110a, 110b and 110c from a side of each of the rods. FIG. 6 shows a combination of side-pumped solid-state rods and back-end pumped laser rods. The illuminator 500 of FIG. 5 shows the processor and associated circuitry 118, power supply 119 and the diodes 520a, 520b and 520c placed in a manner that can pump light into their corresponding rods 110a, 110b and 110c from at least one side of such rods. In such a configuration, a reflective element 510 may be placed adjacent the back end of each of the rods 110a, 110b and 110c to reflect the light into the rods. The remaining elements of the illuminator 500 are shown placed and operate substantially in the same manner as described in reference to FIG. 1.

The illuminator 600 of FIG. 6 shows one diode 620a pumping light into its corresponding rod 110a from a back end while the other diodes 620b and 620c are shown pumping light from the sides of their corresponding rods 110b and 110c, respectively. The processor 118 in each of the configurations of FIG. 5 and FIG. 6 can independently control the current supply to each of the diodes in the manner described in reference to FIG. 1. In any configuration or embodiment of the disclosure, a common power supply, a separate power supply, or a common power supply for some of the diodes and a separate power supply for the remaining diodes may be utilized for supplying current to the diodes.

Figure 2:
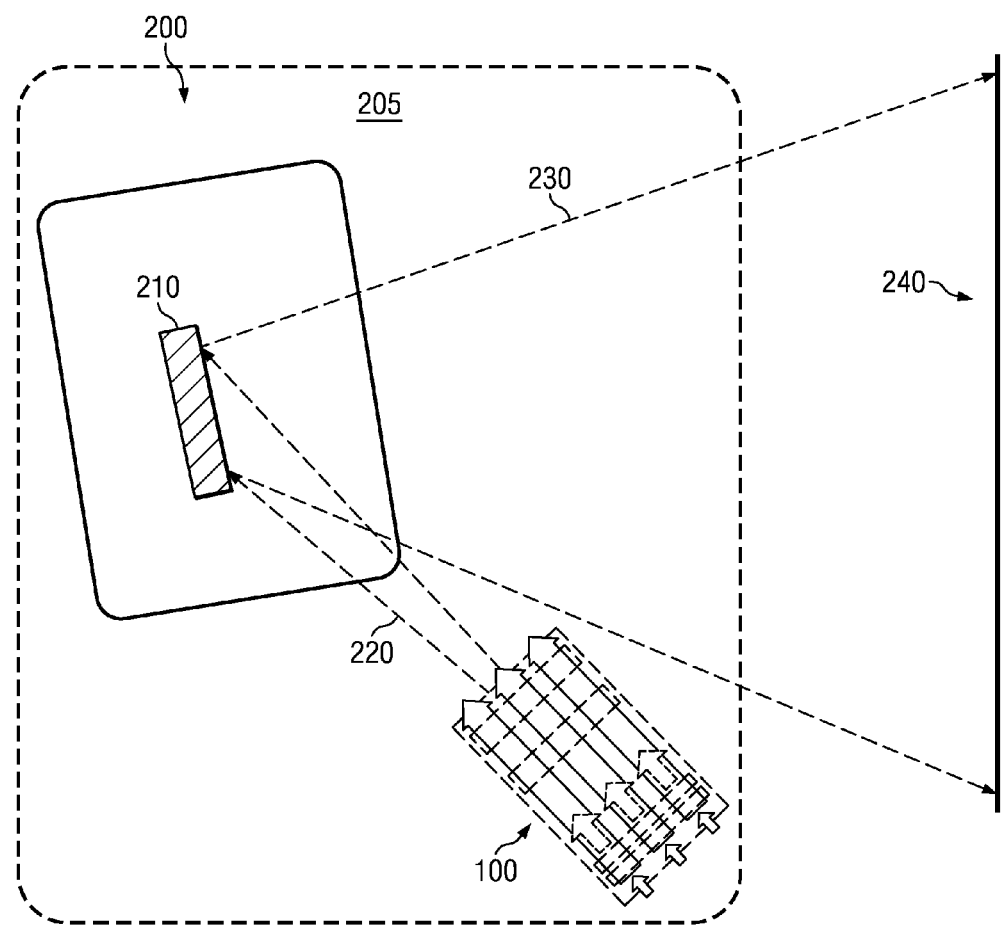
FIG. 2 is a schematic illustration of a light projection system that utilizes an illuminator made according to an embodiment of the disclosure.

FIG. 2 schematically illustrates an exemplary light projection system 200 for displaying an image using an illuminator made according to an embodiment of the disclosure, including illuminators shown and described in reference to FIGS. 1, 5 and 6. The projection optical device projects a beam of light onto a surface such as the surface of a projection display screen 240 to form an image. In one aspect, the projection optical device includes a light source 205 for projecting a light beam 220 in a selected direction and an actuated spatial light modulator (SLM) 210 for diverting the beam toward the screen 240. In one aspect, the light source 205 is a coherent light source, such as a laser or a plurality of lasers. In one aspect, the light beam 220 includes three beams of light, generally at wavelengths in the ranges of red, green, and blue light using segmented diodes described herein. In one aspect, each color of light is produced by an individual laser source. In one aspect, the light source 205 projects the light beam 220 onto an SLM 210, which may include a scanning mirror or DMD. The SLM 210 may displace the light beam 220 substantially to produce light beams 230. The output beam 230 is projected onto the projection display screen 240 to form image 232.

Figure 3:
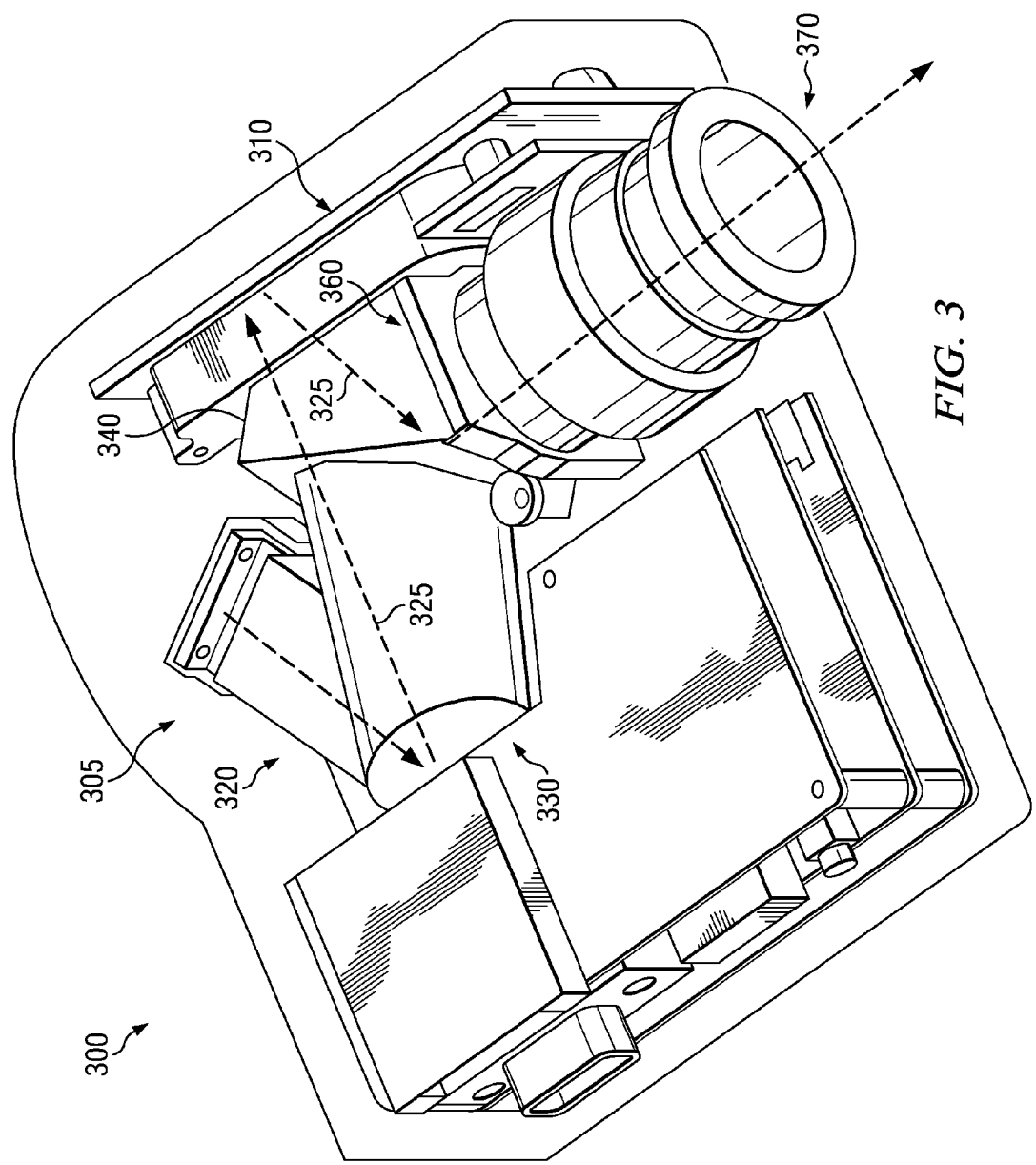
FIG. 3 is an isometric view of a projection system that includes an illuminator made according to an embodiment of the disclosure.

FIG. 3 shows an exemplary projection system 300 (also referred to as a projector) usable to project a spatially modulated light beams produced as described in the present disclosure. The projector 300 includes a coherent light source such as a laser illuminator 305. The projector 300 includes one or more light collection, integration, and/or etendue-matching optical elements 320 arranged to collect and/or to spatially integrate light emitted by the light source. Etendue, as one skilled in the art having the benefit of the present disclosure would know, is the product of the area of emission and the solid angle into which the emission is emitted. The projector 300 may also optionally include a telecentric relay 330 using one or more aspherical refractive and/or reflective components (not shown), and/or a pupil (not shown) for controlling stray light. The projector 300 may also include an illumination wedge prism 340 to direct a light beam such as beam 325 towards an optical element. The projector 300 also includes an SLM 310, such as a DMD, arranged to modulate spatially the light 325 projected onto the SLM. The projector 300 may also include a projection total internal reflection (TIR) prism 360 disposed between the illumination wedge prism 340 and the DMD 310. In one aspect, the TIR prism 360 may be separated by an air gap (not shown) from the illumination wedge prism 340. The projector may also include a projection lens 370 for projecting the output beam onto a display screen.

The telecentric relay 330 provides substantially all the light emitted by the laser illuminator 305 through the illumination wedge prism 340 and through the projection TIR prism 360 to the DMD 310. The DMD reflects and spatially modulates light 325 back through the projection TIR prism 360 that totally internally reflects the spatially modulated light 320 through the projection lens 370 and onto a projection display screen.

Figure 4:
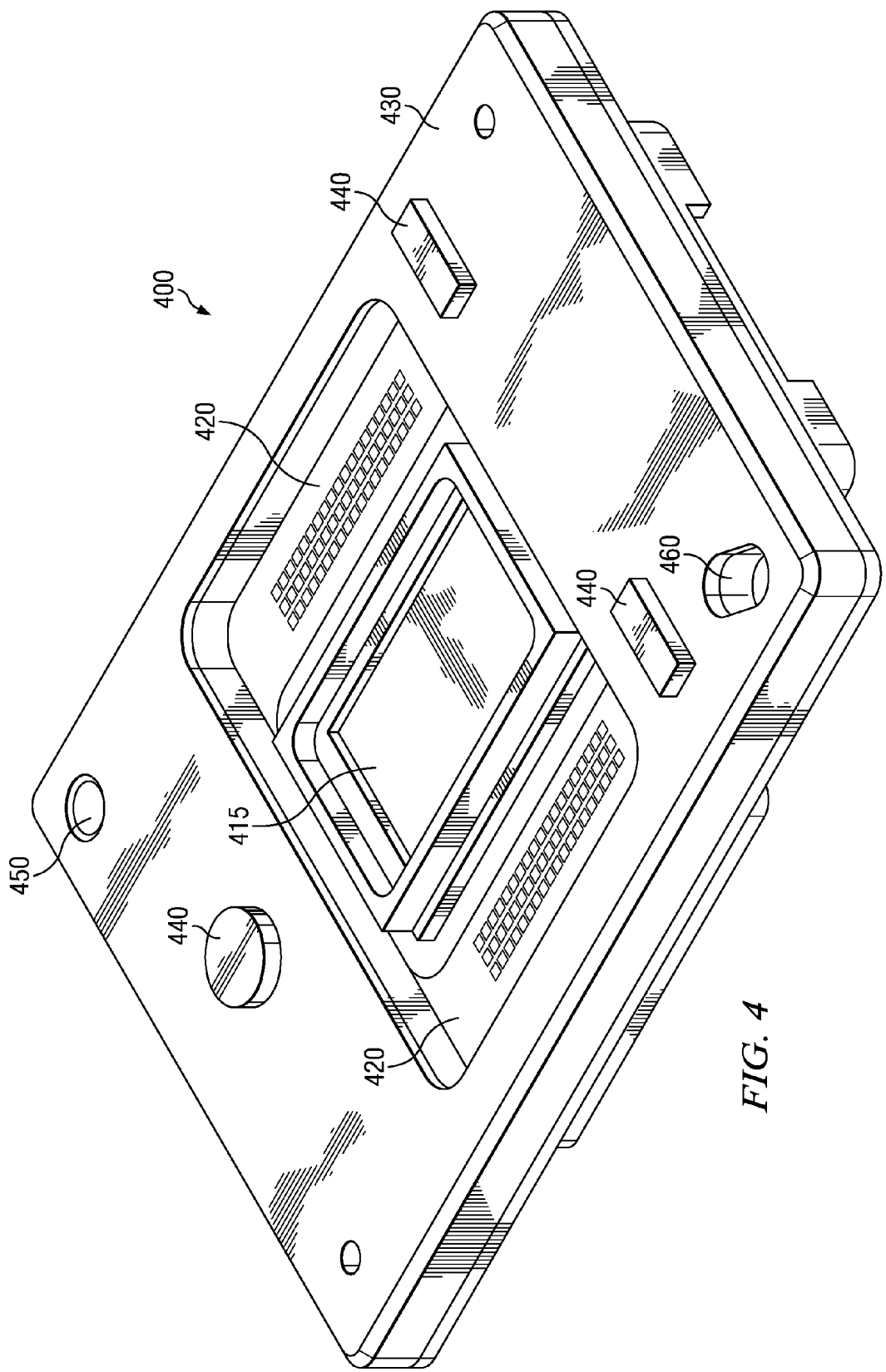
FIG. 4 is a schematic illustration of a spatial light modulator suitable for use with various embodiments, including the system of FIGS. 2 and 3.

FIG. 4 shows a detailed illustration of an exemplary SLM 400 suitable for use with the present disclosure. FIG. 4 shows, in particular, a top perspective view of an SLM 400 usable with an integrated circuit, such as the micro-electro-mechanical system (MEMS) SLM integrated circuit. The SLM 400 has a wafer level package (WLP) DMD chip 415 bonded thereon. One of ordinary skill in the art having the benefit of the present disclosure would appreciate that the device 400 could be used with any suitable integrated circuit, including the MEMS SLM integrated circuit described herein. In one aspect, the device 400 may have the DMD chip 415 wire-bonded on two sides to bond pad area 420. A top surface 430 may provide a substantially flat area for a system aperture and gasket all around (not shown). The device 400 may also have one or more primary datum ('A') alignment features 440, one or more secondary datum ('B') alignment features 450, and one or more tertiary datum ('C') alignment features 460 disposed on the top surface 430. In one embodiment, the SLM may be actuated to orient a light beam at a frequency consistent to provide an image of a single frame at a display screen. Each micromirror is actuated according to a selected program. In one aspect, a micromirror may be actuated in response to an electric current passing through a piezoelectric material attached to the micromirror.

Thus, in one aspect, the disclosure herein provides a method and apparatus for generating light at a plurality of output wavelengths. The present disclosure provides an illuminator for generating light at a plurality of output wavelengths that includes a plurality of diodes, each diode pumping light into a corresponding rod in a plurality of rods at a separate wavelength selected from a first plurality of wavelengths of light and a processor that independently controls electric power input to each of the diodes to balance the generated light at the plurality of output wavelengths. In one aspect, at least one separate rod is associated with each diode for receiving light from its associated diode and for converting the received light into a selected wavelength of a plurality of second wavelengths of light. Each diode may be a solid-state diode. The plurality of diodes pump light into their associated rods in a manner that is one of: (i) at an end of each of the rods; (ii) at a side of each of the rods; and (iii) at an end of at least one rod and at a side of at least one different rod. Each of the diodes in the plurality of diodes is segmented in a manner that is one of: (i) where at least two of the diodes are formed on a common substrate; (ii) where each of the diodes in the plurality of diodes is placed in a separate cavity; and (iii) where the plurality of diodes occupy separate adjacent areas of a common substrate.

A processor controls the current to each diode in the plurality of diodes to balance differences in gains among the plurality of rods so as to balance the generated light at the plurality of output wavelengths. In one aspect, the light illuminator includes a back cavity mirror between the plurality of diodes and an input end of each of the plurality of rods, which back cavity mirror is substantially transmissive to infra-red light and substantially reflective to visible light; and a frequency multiplier that multiples frequency corresponding to light at each wavelength in the second plurality of wavelengths to produce visible light corresponding to each of the wavelengths of the plurality of output wavelengths. The illuminator further may include an output coupler associated with each of the plurality of rods that is substantially transmissive to light at the wavelength received from its corresponding rod and substantially reflective to other wavelengths. In one aspect, the processor controls the electric power in response to a feedback circuit that provides information relating to differences in gains among the rods in the plurality of rods or calibration data relating to the rods in the plurality of rods. Each of the diodes may be one of: (i) a diode arranged to pump luminescent diode light (spontaneous emission); (ii) a laser diode arranged to pump laser light (stimulated emission); and (iii) a diode arranged to pump super radiant light.

Another aspect of the disclosure provides a solid-state illuminator, which includes a plurality of segmented solid-state diode light sources, wherein each solid-state diode light source is arranged to pump light at a selected wavelength of a first plurality of wavelengths of light and a separate solid-state rod associated with each of the solid-state diode light sources, each solid-state rod converting light received from its corresponding solid-state diode from the selected wavelength in the first plurality of wavelengths to a selected wavelength of a second plurality of wavelengths. The solid-state illuminator further includes a processor that independently controls current to each of the solid-state diodes according to programmed instructions to balance gain differences among the solid-state rods in the plurality of solid-state rods. Each solid-state diode may include an array of diodes and each solid-state rod may include a plurality of glass/crystal rods. In another aspects, the diodes may be segmented such that: (i) at least two of the solid-state diodes are formed on a common substrate; (ii) a common structure is used to house at least some of the diodes that allows independent control of each such diode; (iii) a separate epitaxial layer corresponding to each diode is formed on a common substrate; and/or (iv) or a structure that allows independent electric addressability of each diode.

The disclosure further provides a method of generating a plurality of light beams of a solid-state illuminator, including generating light at a first plurality of wavelengths using a plurality of solid-state diodes; activating a separate optical element in a plurality of optical elements by light at a wavelength selected from the first plurality of wavelengths to produce the plurality of light beams; and selectively controlling current applied to each of the plurality of solid-state diodes to balance gain differences among the plurality of optical elements. In one aspect, selectively controlling current may include controlling current to a plurality of solid-state diodes associated with the plurality of optical elements to balance light output from the plurality of solid-state rods. The method of generating the plurality of light beams may include converting the first plurality of wavelengths into a second plurality of wavelengths in the plurality of optical elements; and converting the second plurality of wavelengths into a third plurality of wavelengths using a plurality of frequency multipliers to produce the plurality of light beams.

Another aspect of the disclosure provides a method of producing visible output light beams from a solid-state illuminator, which includes generating light at a first plurality of wavelengths using a plurality of segmented solid-state diodes; and converting light at the first plurality of wavelengths into the visible light beams. Current input provided to each of the solid-state diodes may be selectively controlled to balance gain differences among a plurality of optical elements associated with the solid-state illuminator.

Therefore, as described above, the disclosure provides segmented diode pumping of multiple solid-state rods (i.e., glass rods or crystal rods) for producing multiple colors and an application of the multiple colors for projection display applications. The pump diodes may be segmented physically and/or electrically into areas to provide selective pumping of the solid-state rods, which may be separately aligned to the pump diode segments. The solid-state rods may be end pumped, side pumped or a combination of end and side pumped. The diodes may be segmented diodes or multiple diodes (such as an array of diodes for each rod segments). A common large diode with sufficient power to pump all of the desired rod areas may also be used. Furthermore, any segmentation of diodes may be utilized to produce desired color points or beams. Additionally, any number of glass rods and/or crystal rods may be utilized to provide the desired color points. Also, any segmentation of diodes together with any distribution of glass/crystal rods may be utilized with or without the feature of balancing the gain differences among the rods. The rods may be driven as luminescent sources (spontaneous emission), as laser sources (simulated emission) or as super-radiant sources. Multi-lens arrays, dielectric elements, holographic elements and other desired elements may be placed at any suitable location within the illuminators shown in FIGS. 1, 5 and 6 and other embodiments made in accordance with the disclosure.

While the foregoing disclosure is directed to certain embodiments that may include certain specific elements, such embodiments and elements are shown as examples and various modifications thereto apparent to those skilled in the art may be made without departing from the concepts described and claimed herein. It is intended that all variations within the scope of the appended claims be embraced by the foregoing disclosure.

What is claimed is:

1. An apparatus, comprising:
   a plurality of segmented diodes, each diode producing light at a different first selected wavelength in a first plurality of wavelengths;
   a separate rod associated with each diode, each rod converting the light received from its corresponding diode from the corresponding selected wavelength in the first plurality of wavelengths to a different second selected wavelength in a second plurality of wavelengths, and
   an output coupler associated with each of the plurality of rods that is substantially transmissive to light corresponding to the second plurality of wavelengths.

2. The apparatus of claim 1 further comprising a processor that independently controls current to each of the diodes to balance power among the rods in the plurality of rods.

3. The apparatus of claim 1, wherein each diode includes an array of diodes and each rod includes a plurality of rods.

4. The apparatus of claim 1, wherein the plurality of segmented diodes are formed in a manner that constitutes one of: (i) at least two of the diodes formed on a common substrate; (ii) a common structure comprising the plurality of diodes that allows independent control of each diode; (iii) a common substrate that includes a separate epitaxial structure corresponding to each diode; (iv) a separate cavity on a common structure corresponding to each diode; and (v) a structure that allows independent electric addressability of each diode.

5. The apparatus of claim 1, wherein each diode is one of: (i) a diode arranged to pump luminescent diode light into its corresponding rod; and (ii) a laser diode arranged to pump laser light into its corresponding rod.

6. The apparatus of claim 1, wherein the plurality of diodes pump light into the rods in a manner that is one of: (i) at an end of each of the rods; (ii) at a side of each of the rods; and (iii) at an end of at least one rod and at a side of at least one other rod.

7. The apparatus of claim 1 further comprising (i) a back cavity mirror between the plurality of diodes and an input end of each of the plurality of rods that is substantially transmissive to infrared light and substantially reflective to visible light; and (ii) a frequency multiplier that multiples frequency corresponding to light at each wavelength in the second plurality of wavelengths to produce visible light corresponding to each of the wavelengths in the second plurality of wavelengths.

8. The apparatus of claim 1, wherein the plurality of diodes are segmented as one of: (i) physically; and (ii) electrically.

9. An apparatus, comprising:
   a plurality of diodes, each diode pumping light into an associated optical elements in a plurality of optical elements, each associated optical element converting the light from a first wavelength to a second wavelength; and
   a processor that independently controls electric power to each diode to balance power among the plurality of optical elements, wherein the processor controls the electric power in response to at least one of: (i) a feedback signal that provides information relating to the output from each of the optical elements; and (ii) a look-up table.

10. The apparatus of claim 9, wherein each optical element is a rod and wherein the plurality of diodes pump light in a manner that is one of: (i) at an end of each of the rods; (ii) at a side of each of the rods; and (iii) at an end of at least one rod and at a side of at least one other rod.

11. The apparatus of claim 9, wherein the processor further controls the power to each diode in the plurality of diodes to balance light generated by the apparatus at a plurality of visible wavelengths of light.

12. The apparatus of claim 9, wherein diodes in the plurality of diodes are
   formed in a manner that includes one of: (i) at least two diodes formed on a common substrate; (ii) a common structure comprising the plurality of diodes that allows independent control of each diode; and (iii) a separate epitaxial structure corresponding to each diode formed on a common substrate.

13. The apparatus of claim 9 further comprising:
   a back cavity mirror between the plurality of diodes and an input end of each optical element that is substantially transmissive to infrared light and substantially reflective to visible light; and
   a frequency multiplier that converts light produced at an output end of each optical element into a visible light.

14. The apparatus of claim 9, wherein each diode is one of: (i) a diode arranged to pump luminescent diode light; (ii) a laser diode arranged to pump laser light; and (iii) a diode arranged to pump super radiant light.

15. A method of generating a plurality of light beams, comprising:
   generating light at a first plurality of wavelengths using a plurality of diodes;
   activating a separate optical element in a plurality of optical elements using light at a wavelength selected from the first plurality of wavelengths to produce light having a different wavelength;
   converting the second plurality of wavelengths into a third plurality of wavelengths; and
   independently controlling current applied to each of the plurality of diodes to balance power among the plurality of optical elements.

16. The method of claim 15 further comprising converting light at each wavelength in the first plurality of wavelengths into light at a selected wavelength in a second plurality of wavelengths.

17. A method of producing a plurality of visible light beams, comprising:

generating light at a first plurality of different infrared wavelengths using a plurality of corresponding different segmented diodes; and converting the light at the first plurality of different infrared wavelengths into the plurality of visible light beams having different visible wavelengths.

18. The method of claim 17 further comprising independently controlling current to each diode to balance gain differences among a plurality of rods associated with the solid-state diodes.

* * * * *